(12) United States Patent
Wu et al.

(10) Patent No.: US 8,022,869 B2
(45) Date of Patent: Sep. 20, 2011

(54) APPARATUS AND METHOD FOR CROSS-CORRELATION SPUR MITIGATION

(75) Inventors: Jie Wu, San Diego, CA (US); Rizwan Ahmed, Alexandria, VA (US); Emilija M. Simic, La Jolla, CA (US); Dominic Gerard Farmer, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 540 days.

(21) Appl. No.: 12/129,397

(22) Filed: May 29, 2008

(65) Prior Publication Data

US 2009/0295631 A1    Dec. 3, 2009

(51) Int. Cl.
G01S 19/24    (2010.01)
G01S 19/37    (2010.01)

(52) U.S. Cl. ............... 342/357.63; 342/357.77; 375/150
(58) Field of Classification Search ............. 342/357.74, 342/357.59, 357.61, 357.63, 357.77, 357.78; 375/148, 150
See application file for complete search history.

(56) References Cited

U.S. PATENT DOCUMENTS

| | | | |
|---|---|---|---|
| 5,488,662 A * | 1/1996 | Fox et al. ............... | 380/34 |
| 6,236,354 B1 | 5/2001 | Krasner | |
| 6,707,422 B2 * | 3/2004 | Sheynblat et al. ........ | 342/357.25 |
| 7,006,556 B2 * | 2/2006 | Abraham et al. ............. | 375/142 |
| 7,209,076 B2 * | 4/2007 | Roh ......................... | 342/357.59 |
| 2004/0196183 A1 | 10/2004 | Roh | |

FOREIGN PATENT DOCUMENTS

| | | |
|---|---|---|
| EP | 1788405 | 5/2007 |
| WO | WO0147171 A2 | 6/2001 |

OTHER PUBLICATIONS

International Search Report and Written Opinion—PCT/US2009/045020, International Search Authority—European Patent Office—Jun. 4, 2010.
Zheng B et al: "GPS Software Receiver Enhancements for Indoor Use" Ion GNSS. International Technical Meeting of the Satellitedivision of the Institute of Navigation, Washington, DC, US, Sep. 13, 2005), pp. 1138-1142, XP007901536 p. 1141, section "Cross-correlation detection and mitigation".

* cited by examiner

*Primary Examiner* — Thomas Tarcza
*Assistant Examiner* — John B Vigushin
(74) *Attorney, Agent, or Firm* — Linda G. Gunderson

(57) ABSTRACT

An apparatus and method for cross-correlation spur mitigation comprising choosing from a plurality of peak measurements, a first peak measurement with a first carrier-to-noise density estimate and a first Doppler offset measurement, and a second peak measurement with a second carrier-to-noise density estimate and a second Doppler offset measurement to form a pair; calculating a carrier-to-noise density difference based on the first carrier-to-noise density estimate and the second carrier-to-noise density estimate; calculating a Doppler difference based on the first Doppler offset measurement and the second Doppler offset measurement; comparing the carrier-to-noise density difference to a carrier-to-noise density threshold; and comparing the Doppler difference to at least one Doppler threshold.

47 Claims, 3 Drawing Sheets

US 8,022,869 B2

APPARATUS AND METHOD FOR CROSS-CORRELATION SPUR MITIGATION

FIELD

This disclosure relates generally to apparatus and methods for cross-correlation spur mitigation. More particularly, the disclosure relates to mitigating satellite signal interference in a GNSS receiver.

INCORPORATION BY REFERENCE

U.S. Pat. No. 7,209,076 to Roh entitled "Cross-Correlation Mitigation Method and Apparatus For Use In A Global Positioning System Receiver" is hereby incorporated by reference in the patent specification.

BACKGROUND

Global Navigation Satellite System (GNSS) receivers determine position by computing the relative time of arrival (TOA) of ranging signals that are simultaneously transmitted from a plurality of GNSS satellites orbiting the earth and/or pseudolites (collectively referred to herein as "GNSS sources"). GNSS sources transmit timing and satellite orbital (e.g. ephemeris) data in addition to ranging signals. As described herein, GNSS sources can include the United States Global Positioning System (GPS), the Russian Glonass system, the European Galileo system, any system that uses satellites from a combination of satellite systems, or any satellite system developed in the future (collectively called as "SPS" or "Satellite Positioning System"). Furthermore, some position determination systems utilize pseudolites or a combination of satellites and pseudolites. Pseudolites are ground-based transmitters that broadcast a ranging code, such as a PN code (similar to a GPS or CDMA cellular signal), modulated on a carrier signal which may be synchronized with time provided by an SPS. Pseudolites are useful in situations where SPS signals from an orbiting satellite might be unavailable. The GNSS sources, as referred herein, include SPS, pseudolites or a combination thereof.

GNSS receivers determine pseudoranges to various GNSS sources and compute the position of the receiver using the calculated pseudoranges, timing and ephemeris data. The pseudoranges are time delay (a.k.a. code phase) values measured between the received signal from each GNSS source and a local reference function. Acquisition of the GNSS source signal can take up to several minutes and must be accomplished using a sufficiently strong received signal to achieve low error rates.

Each GNSS source transmits a RF signal which is modulated by a code whose phase is used to provide the time (and thus distance) accuracy needed for positioning applications. In some systems, a pseudorandom noise (PN) ranging code is unique to each GNSS source (e.g., the U.S. GPS system), while in others a common code is used while the carrier frequency is unique to the GNSS source (e.g., the Russian Glonass system). In addition, the RF signal is also modulated by a navigation data message. In one example, GPS sources transmit using the same carrier frequency at the same time. Thus, the GNSS receiver discriminates each GNSS source signal by the well-known code division multiple access (CDMA) technique. The PN codes are selected to be nearly orthogonal (uncorrelated) to each other. For purposes of description and not limitation, the following description concentrates primarily on CDMA satellite systems.

In order to determine position information for a GNSS receiver, the time between the transmission of the signal and its reception at the receiver is needed. The time difference may be determined partially by (e.g.) demodulating the data stream of the navigation message and using frame and bit synchronization, while the PN code phase offset of the received signal is used to determine time more precisely. The initial determination of the code phase offset for a particular satellite is referred to as acquisition of that satellite.

In general, to acquire and track a desired GNSS source that is in common view with several other GNSS sources, a GNSS receiver can replicate the unique PN code and the carrier signal, including Doppler offsets, to generate a two-dimensional reference function. The GNSS receiver can then correlate the received signal (which is a composite of many GNSS source signals received by the GNSS receiver) with the two-dimensional reference function to yield a two-dimensional correlation function indexed in time delay and Doppler offset. Maximum correlation occurs when the time delay and Doppler offset of the reference function matches the time delay of the incoming PN code and the Doppler offset of the desired signal (extracted from the received signal). After acquisition, the GNSS receiver maintains track of the desired signal by continuous adjustment of the time delay and Doppler offset (which varies with the relative velocity between the receiver and the satellite).

In general, signals transmitted from different GNSS sources do not significantly interfere with each other since they use unique PN codes (which are nearly orthogonal to one another) and/or unique carrier frequencies. The interference level depends on the relative amplitude of the received signal. Under some conditions, one or more signals transmitted by the GNSS sources can be attenuated relative to signals transmitted by other GNSS sources. The presence of strong GNSS signals produces interference that can reduce the ability to track weaker GNSS signals.

In one example, cross-correlation spurs (spurious maxima when correlating one PN code with another PN code that may be wrongly declared as true auto-correlation peaks and may thus cause false acquisition) are generated when an interfering GNSS source is received at certain frequencies relative to the search frequency of the desired GNSS source. In one example, since the C/A (coarse/acquisition) PN codes of the GPS satellites have a period of 1 ms, the most significant cross-correlation maxima occur when the Doppler difference between the interfering GPS satellite and the desired source is a multiple of 1 kHz (the reciprocal of the PN code period). Additionally, there may be weaker cross-correlation spurs at other frequencies. These cross-correlation spurs can cause false acquisitions, for example under certain Doppler difference and/or antenna gain conditions. In one example, a desired source may be at a low elevation angle, may suffer multipath loss, have greater atmospheric loss and/or be received with lower antenna gain all compared to an interfering source at a high elevation angle. In this example, the relative cross-correlation maxima between the desired reference signal and the undesired signal (from the interfering source) may be relatively high which causes a false acquisition (that is, the receiver may determine that it has acquired satellite A, when instead the received signal that produces the spurious peak in the correlation function was from satellite B). As a consequence of these spurious cross-correlation maxima, the GNSS receiver may falsely acquire the undesired signal which cannot subsequently be tracked, generally leading to an incorrect position fix.

SUMMARY

Disclosed is an apparatus and method for cross-correlation spur mitigation. According to one aspect, a method for cross-correlation spur mitigation comprises choosing from a plurality of peak measurements, a first peak measurement with a first carrier-to-noise density estimate and a first Doppler offset measurement, and a second peak measurement with a second carrier-to-noise density estimate and a second Doppler offset measurement to form a pair; calculating a carrier-to-noise density difference based on the first carrier-to-noise density estimate and the second carrier-to-noise density estimate; calculating a Doppler difference based on the first Doppler offset measurement and the second Doppler offset measurement; comparing the carrier-to-noise density difference to a carrier-to-noise density threshold; and comparing the Doppler difference to at least one Doppler threshold.

According to another aspect, a GNSS receiver comprises a digital signal processor for performing cross-correlation testing on a plurality of peak measurements wherein the digital signal processor includes a processing unit for performing the following: choosing from the plurality of peak measurements, a first peak measurement with a first carrier-to-noise density estimate and a first Doppler offset measurement, and a second peak measurement with a second carrier-to-noise density estimate and a second Doppler offset measurement to form a pair; calculating a carrier-to-noise density difference based on the first carrier-to-noise density estimate and the second carrier-to-noise density estimate; calculating a Doppler difference based on the first Doppler offset measurement and the second Doppler offset measurement; comparing the carrier-to-noise density difference to a carrier-to-noise density threshold; and comparing the Doppler difference to at least one Doppler threshold. In one aspect, the GNSS receiver is a GPS receiver.

According to another aspect, a computer-readable medium including program code stored thereon, comprises program code to choose from a plurality of peak measurements, a first peak measurement with a first carrier-to-noise density estimate and a first Doppler offset measurement, a id a second peak measurement with a second carrier-to-noise density estimate and a second Doppler offset measurement to form a pair; program code to calculate a carrier-to-noise density difference based on the first carrier-to-noise density estimate and the second carrier-to-noise density estimate; program code to calculate a Doppler difference based on the first Doppler offset measurement and the second Doppler offset measurement; program code to compare the carrier-to-noise density difference to a carrier-to-noise density threshold; and program code to compare the Doppler difference to at least one Doppler threshold.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

The various illustrative logical blocks, modules, and circuits described herein may be implemented or performed with one or more processors. A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules, and circuits described herein may also include computer readable medium for storing software. The computer readable medium may also include one or more storage devices, a transmission line, or other physical medium.

GNSS Receiver System

Figure 1:
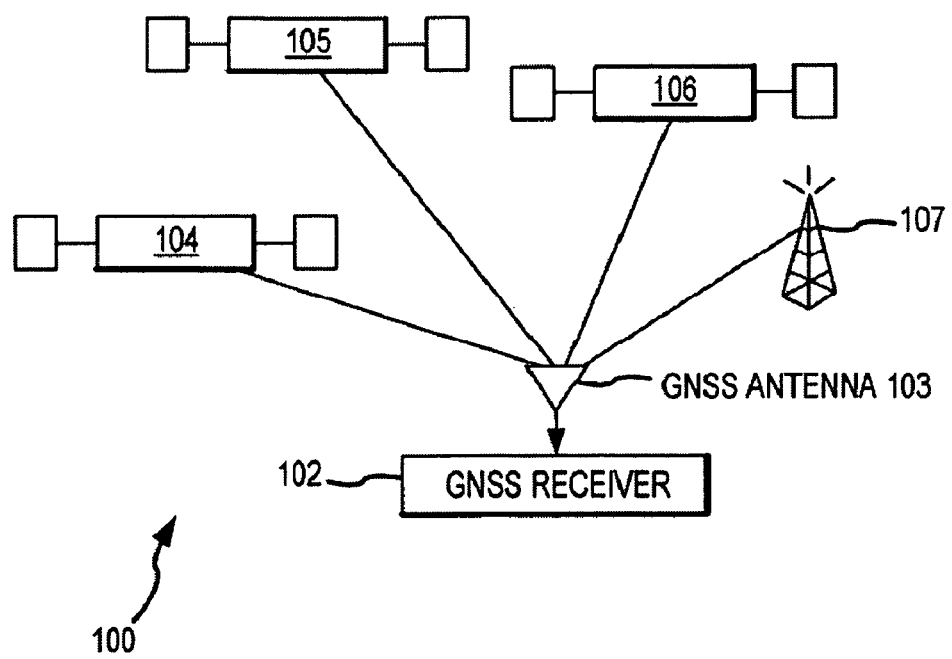
FIG. 1 illustrates an exemplary GNSS system.

FIG. 1 illustrates an exemplary GNSS system 100 which includes a GNSS receiver 102 for receiving a plurality of received signals through a GNSS antenna 103 from a plurality of GNSS sources 104, 105, 106, 107. Typically, a minimum of four GNSS sources are required to determine the position of the GNSS receiver 102 in three dimensions and to resolve the GNSS receiver clock bias. However, one skilled in the art would understand that the number of in-view GNSS sources may be greater or less than the four illustrated in FIG. 1. After receiving the received signals, the GNSS receiver 102 processes the received signals to yield a position estimate.

Figure 2:
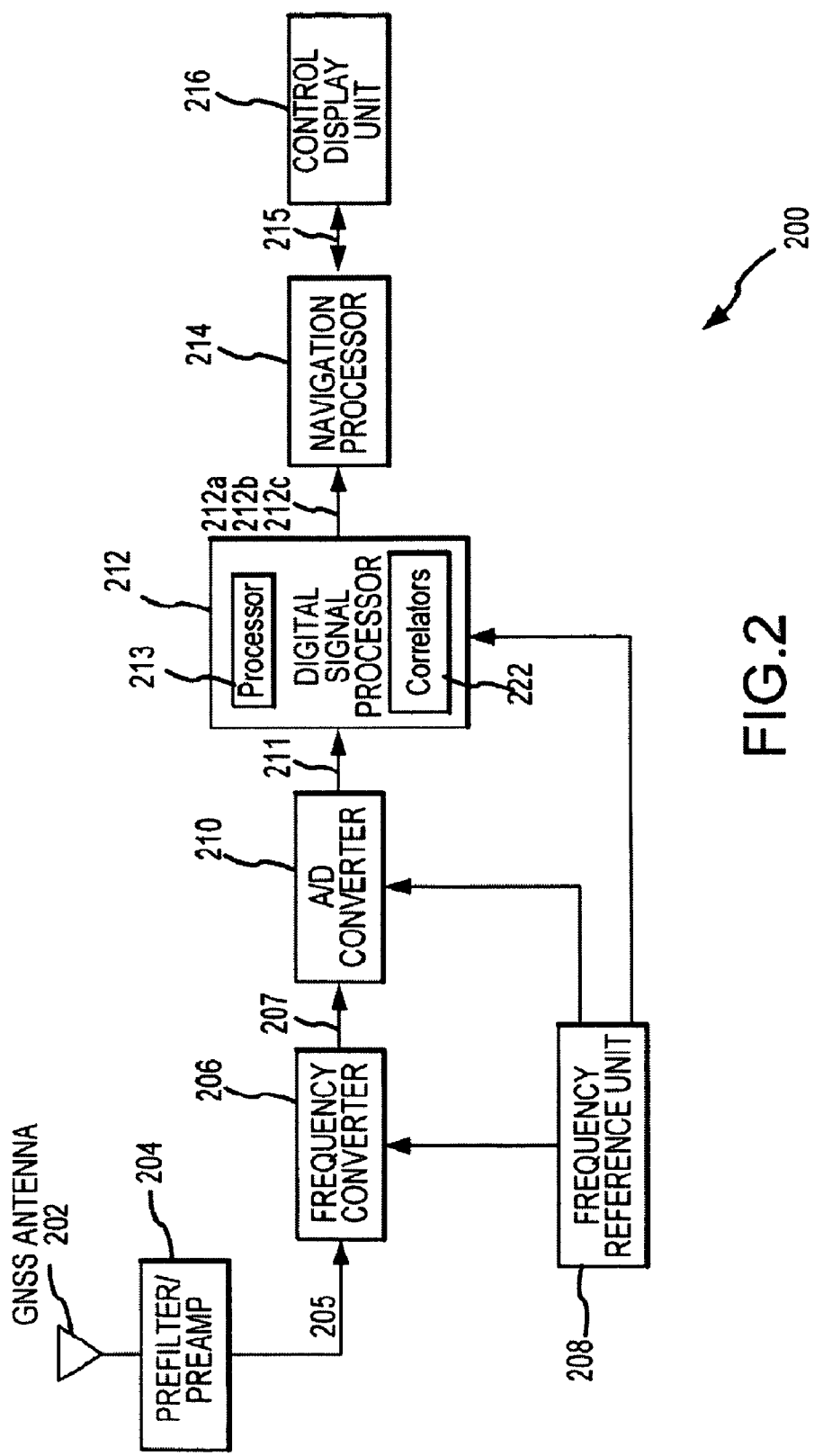
FIG. 2 illustrates an exemplary block diagram of a GNSS receiver.

FIG. 2 illustrates an exemplary block diagram of a GNSS receiver 200. FIG. 2 shows a particular implementation of a receiver and describes an example of processing CDMA satellite signals. Other implementations are possible; for example, the receiver may also process frequency division multiplexed signals (such as GLONASS signals), and may perform the processing differently (e.g., frequency downconversion and processing may be performed differently). The illustrated GNSS receiver 200 includes the following components: a GNSS antenna 202, a pre-filter/pre-amplifier 204, a frequency converter 206, a frequency reference unit 208, an analog-to-digital (A/D) converter 210, a digital signal processor (DSP) 212, a navigation processor 214 and a control/display unit 216. The RF (CDMA) signals transmitted by the GNSS sources 104, 105, 106, 107, are received by the GNSS antenna 202 and inputted to the pre-filter/pre-amplifier 204 for broadband frequency selection and low noise amplification to produce filtered CDMA signals 205. The filtered CDMA signals 205 are then inputted to the frequency converter 206 to lower the center frequency and produce downconverted CDMA signals 207. The downconverted CDMA signals 207 are inputted to the A/D converter 210 to produce digitized CDMA signals 211. The digitized CDMA signals 211 are then inputted to the DSP 212. The DSP 212 contains N parallel signal processing channels to simultaneously track the carrier frequencies and PN codes from up to N GNSS sources. The DSP 212 correlates the digitized CDMA signals 211 with reference functions to generate peak measurements. One skilled in the art would understand that the quantity N can be any feasible number for a particular application or system. Each signal processing channel contains a PN code loop and a carrier phase tracking loop that perform PN code and carrier phase measurements as well as navigation message data demodulation. In one aspect, each signal processing channel yields pseudorange measurements 212a related to the GNSS source and GNSS receiver relative distance. In another aspect, each signal processing channel yields Doppler offset measurements 212b related to the GNSS source and GNSS receiver relative velocity. The pseudorange measurements 212a, Doppler offset measurements 212b, and demodulated navigation message data 212c are then inputted to the navigation processor 214. The navigation processor 214 accepts the pseudorange measurements 212a, Doppler offset measurements 212b and the demodulated navigation message data 212c and produces a position estimate 215. The position estimate 215 is then inputted to the control/display unit 216 for display to the user. In addition, the GNSS receiver 200 includes a frequency reference unit 208 which generates frequency references for the frequency converter 206, sampling clocks for the A/D converter 210, and digital timing signals for the DSP 212.

In one aspect, the GNSS receiver 200 comprises a plurality of correlators 222 such as digital correlators or matched filters in the DSP 212. The digital correlators are matched to the unique PN code for each RF signal transmitted by each GNSS source and are used to discriminate among the plurality of simultaneous RF signals being transmitted by the various GNSS sources.

In one aspect, the control/display unit 216 provides a human user interface between the GNSS receiver 200 and a user. The control/display unit 216 permits operator data entry, displays status and navigation solution parameters and permits access to a number of navigation functions. In one aspect, the control/display unit 216 provides position estimates 215 that are calculated by the navigation processor 214. In one aspect, the control/display unit 216 is coupled to an external input/output device (not shown), such as but not limited to a communication transceiver, to transmit the processed data to a remote processor or to a user.

In one aspect, the frequency reference unit 208 accepts timing corrections from the navigation processor 214 or other processors (not shown) to correct for frequency errors. In one aspect, the timing corrections are performed within the DSP 212.

As noted above, one skilled in the art would understand that the components illustrated in FIG. 2 are shown only as examples and that a GNSS receiver can include fewer than the components shown in FIG. 2 and still be within the spirit and scope of the present disclosure. Similarly, a GNSS receiver can include additional components not shown in FIG. 2, or the GNSS receiver can include some of the components shown in FIG. 2 and some other components not shown in FIG. 2 and still be within the spirit and scope of the present disclosure. In one example, the GNSS receiver 200 can include a processor unit 213. In the example illustrated in FIG. 2, the processor unit 213 is part of the digital signal processor 212. In some implementations, the processor unit 213 is a separate component from the digital signal processor 212. The processor unit 213 may provide overall control and management functions for the GNSS receiver. In one aspect, the processor unit 213 comprises a central processing unit (CPU), memory, and associated software. In one aspect, the GNSS receiver is a GPS receiver.

GNSS Signal Format

Each received signal (by the GNSS receiver) may be represented in the form:

$$G_k(t) = A_k M_k(t-d) P_k(t-d, R_k) \exp[j(2\pi f_k t + \phi_k)] \quad (1)$$

where $A_k$ is the signal amplitude from the GNSS source k; $P_k$ is the PN code for the GNSS source k; $M_k$ is the navigation message data for the GNSS source k; $f_k$ is the carrier frequency; $\phi_k$ is the carrier phase, d is a time delay that may be interpreted as a time of arrival, $R_k$ is the frequency offset of the chip rate due to the Doppler effect for the GNSS source k (referred to as the Doppler offset). The PN codes $P_k$ are selected to obtain low cross-correlation characteristics by particular mathematical optimization techniques. In one aspect, the PN codes $P_k$ are chosen to be Gold codes with low cross-correlation properties.

In one aspect, although all the GNSS sources transmit their RF signals at the same frequency (due to the use of atomic frequency references), the carrier frequencies $f_k$ as seen by the GNSS receiver 200 may differ due to the different Doppler offsets. The Doppler offsets also cause the PN codes to have slightly different chip rates, as indicated by the parameter $R_k$ in equation (1). In one aspect, the GNSS source is a GPS source and the GNSS receiver is a GPS receiver. The Doppler offsets for the GNSS sources are generally all different at a particular time, and the Doppler offset for a particular GNSS source varies with time.

Correlation Processing

GNSS receiver 200 determines the time of arrival of the desired signal by correlating the received signal with a local reference function $f(t) = P_k(t)$. For example, assume that the carrier frequency $f_k$ of Equation (1) above is known (or estimated correctly); then $f_k$ of equation (1) could be set to zero. In the absence of noise, if $G_k$ is multiplied by a local reference $P_k(t-s,0)$ (assuming $R_k$ is small), and then integrated over a period of several PN frames such that $m_k$ is unchanged, the result is Equation (2) below:

$$r_{kk}(d,s,R_k) = A_k M_k(t-d) \exp[j\phi_k] \int_0^T P_k(t-d,R_k) P_k(t-s,0) \, dt \quad (2)$$

where the local reference function has relative time delay s, with respect to a common time origin. In practice, the correlation processing performs the integration in equation (2) by setting s to different hypothesized time delays. If the local reference function is aligned in time delay with the desired signal, then s=d, and the integrand in equation (2) is maximized to yield a maximum desired correlation value for $r_{kk}(d,s,R_k)$. If s does not equal d, the integrand is not maximized and varies in a pseudorandom manner about zero. In the case where $T = N T_c$ (where $T_c$ is the chip duration of the PN code and N is an integer), when s=d, equation (2) simplifies to $$r_{kk}(d,s,R_k) = A_k M_k(t-d) \exp[j\phi_k] N T_c. \quad (3)$$

The acquisition processing can determine the time of arrival of the desired signal by performing the correlation operation of equation (2) for different time delay hypotheses s. The time delay value s=d which yields the largest desired correlation output is the estimate for the desired signal time of arrival. In one aspect, the correlation processing is performed in DSP 212 as a serial correlation, as a parallel correlation, or by matched filtering.

Interference Considerations

The above discussion assumes that the reference function and desired signals employ the same PN ranging code. In general, the composite received signal also contains other GNSS signals with different PN ranging codes and Doppler frequency offsets. As an example, a GNSS source q with PN code $P_q$ correlated with a different code $P_k$ associated with source k yields a cross-correlation output given by $$r_{kq}(d,s,R_q) = A_q M_q(t-d) \exp^{[j\,4q]} \int_0^T P_q(t-d,R_q) P_k(t-s,0) \exp^{[j\,2\pi\delta t]} dt \quad (4)$$

where δ is a residual frequency error due to the mismatch between the reference function $f(t)=P_k(t)$ and the undesired GNSS source q.

Although in general the integrand in equation (4) is small compared to unity due to the low cross-correlation properties of the PN ranging codes $P_q$ and $P_k$, the cross-correlation output $r_{kq}$ may still be high compared to the auto-correlation output $r_{kk}$ if the interfering amplitude $A_q$ is large compared to the desired amplitude $A_k$ at some time delay s. The cross-correlation spurs of equation (4) can appear as a false signal to the GNSS receiver when the desired signal is blocked or heavily attenuated by the propagation environment. Therefore, it is desirable to detect the presence of cross-correlation spurs and to reduce their effect on the acquisition and processing of the desired signal.

Cross-correlation spurs are generated when an interfering strong GNSS source is received at certain frequencies relative to the search frequency of another GNSS source. Cross-correlation spurs need to be identified and removed from the measurements to ensure good performance. In one aspect, the cross-correlation tests are based on the fact that the cross-correlation spur and the real peak measurements have certain differences in strength and frequency. In one aspect, peak measurements from pairs of GNSS sources are obtained (e.g., pairs spanning every two GNSS sources), and the cross-correlation test identifies the weak peak measurement as a cross-correlation spur if the C/No (carrier-to-noise density) difference and Doppler difference are inside any of the masks (that is, within thresholds defined for the cross-correlation test).

Figure 3:
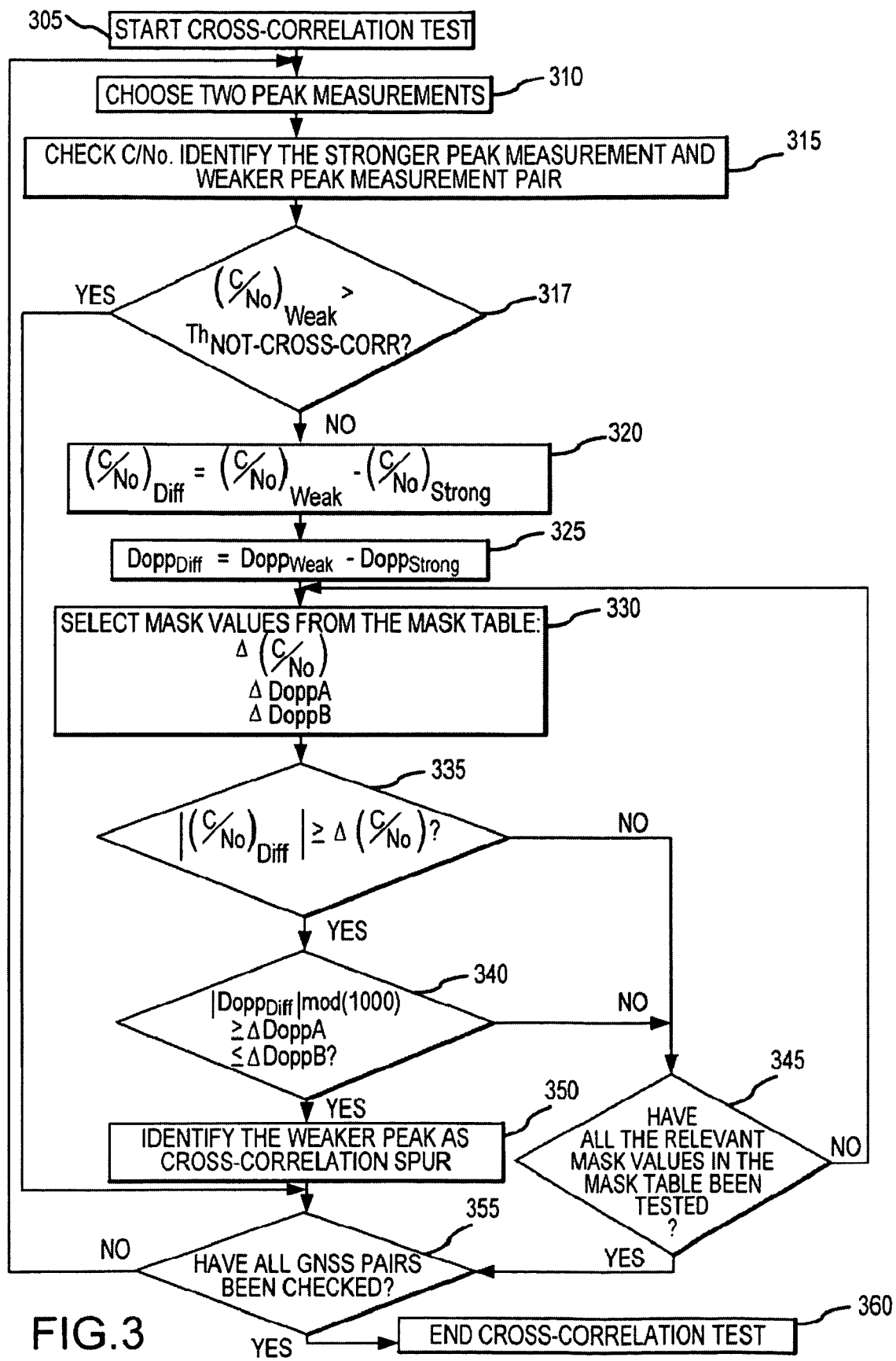
FIG. 3 illustrates an exemplary flow diagram of a cross-correlation test to mitigate cross-correlation spurs in GNSS receivers.

FIG. 3 illustrates an exemplary flow diagram of a cross-correlation test to mitigate cross-correlation spurs in GNSS receivers. The cross-correlation algorithm compares the reported peak measurements with the peak measurements of all other GNSS sources in the database. In one example the database could include a measurement database and a separate candidate database where the candidate database stores peak measurements that are determined likely to be real peaks. The peak measurements that fail the test are flagged as a cross-correlation spur, and are removed from further processing.

In one aspect, the cross-correlation test is the same for any sampling rate. Its input are two peak measurements (for example, the C/No estimation, Doppler estimations, coherent and non-coherent integration time associated with two peak measurements), and its output is whether any of the two input peak measurements is a cross-correlation spur.

In block 305, the cross correlation test is initiated to proceed to block 310. In block 310, choose one GNSS source peak measurement and a second GNSS source peak measurement to form a GNSS pair and then proceed to block 315. In block 315, determine the stronger GNSS source peak measurement and the weaker GNSS source peak measurement in the GNSS pair by comparing the C/No estimates associated with the GNSS source peak measurements. In block 317, the C/No estimate associated with the weaker GNSS source peak measurement is compared to a Not-Cross-Correlation Threshold ($Th_{not-cross-corr}$). In one example, $Th_{not-cross-corr}$ is 37 dB-Hz. If the C/No estimate associated with the weaker GNSS source peak measurement is greater than $Th_{not-cross-corr}$, proceed to block 355. In this case, the weaker GNSS source peak measurement is not a cross-correlation spur. On the other hand, if the C/No estimate associated with the weaker GNSS source peak measurement is not greater than $Th_{not-cross-corr}$, proceed to block 320. In block 320, calculate the C/No difference by subtracting the C/No of the stronger GNSS source peak measurement from the C/No of the weaker GNSS source peak measurement:

$$(C/No)_{diff} = (C/No)_{weak} - (C/No)_{strong}$$

In block 325, calculate the Doppler difference based on the Doppler offset measurements associated with the GNSS source peak measurements and then proceed to block 330. In one example, modulo 1 kHz arithmetic is used.

$$Dopp_{diff} = Dopp_{weak} - Dopp_{strong}$$

$Dopp_{weak}$ is the Doppler offset measurement associated with the weaker GNSS source peak measurement. $Dopp_{strong}$ is the Doppler offset measurement associated with the stronger GNSS source peak measurement.

In block 330, select a set of mask (a.k.a. threshold) values (Δ(C/No) carrier-to-noise density threshold, ΔDoppA minimum Doppler threshold, and ΔDoppB maximum Doppler threshold) based on the search mode of the weaker GNSS source from a cross-correlation mask table. In one example, different sets of mask values are included in the cross-correlation mask table. Different sets of mask values are used for different search modes of the weaker GNSS source. One skilled in the art would understand that specific mask values may be chosen based on system application or design choice without affecting the spirit or scope of the present disclosure.

In blocks 335 and 340, the calculated C/No and Doppler differences (i.e., $(C/No)_{diff}$ and $Dopp_{diff}$ are compared with the mask (a.k.a. threshold) values (Δ(C/No), ΔDoppA and ΔDoppB) selected in block 330. In particular, in block 335, determine if the absolute value of the C/No difference i.e., $(C/No)_{diff}$ exceeds or equals Δ(C/No). If no, proceed to block 345. If yes, proceed to block 340. In block 340, determine if the absolute value of the Doppler difference $Dopp_{diff}$, modulo 1 kHz, exceeds or equals the ΔDoppA. One skilled in the art would understand that modulo 1 kHz is chosen as an example and that other modulo values may be used without affecting the spirit or scope of the present disclosure, depending on the parameters of the GNSS system. As noted above, for GPS, Doppler differences of 1 kHz and its multiples are associated with larger cross-correlations. If the absolute value of the Doppler difference $Dopp_{diff}$, does not exceed or equal ΔDoppA, proceed to block 345. If the absolute value of the Doppler difference $Dopp_{diff}$, modulo 1 kHz, exceeds or equals ΔDoppA, determine if the absolute value of the Doppler difference $Dopp_{diff}$, modulo 1 kHz, is less than or equals ΔDoppB. Again, one skilled in the art would understand that modulo 1 kHz is chosen as an example and that other modulo values may be used without affecting the spirit or scope of the present disclosure. If the absolute value of the Doppler difference $Dopp_{diff}$ is not less than or is not equal to ΔDoppB, proceed to block 345. If the absolute value of the Doppler difference $Dopp_{diff}$ is less than or equals ΔDoppB, proceed to block 350. In one aspect, the comparison of the Doppler difference $Dopp_{diff}$ is first made with the ΔDoppA and then with the ΔDoppB value. In another aspect, the comparison of the Doppler difference $Dopp_{diff}$ is first made with the ΔDoppB and then with the ΔDoppA value. In the example values shown, the, Doppler difference Dopp$_{diff}$ is between 0 to 500 Hz. One example of the pseudo-code for the calculations in blocks 335 and 340 are as follows:

```
cn0_diff = sv1->c_n0 – sv2->c_n0;
cn0_diff = ABS_VAL(cn0_diff);
freq_diff_mod1k = ABS_VAL(sv1->doppler – sv2->doppler) % 1000;
  if(freq_diff_mod1k >= 500)
  {
    freq_diff_mod1k = 1000 – freq_diff_mod1k;
  }
where sv1 is a GNSS source and sv2 is another GNSS source.
```

In block 350, identify the weaker peak measurement as a cross-correlation spur and proceed to block 355. In block 345, determine if all the relevant mask values in the cross-correlation mask table have been tested. In one example, different sets of mask values are included in the cross-correlation mask table. Different sets of mask values are used for different search modes of the weaker GNSS source. One skilled in the art would understand that specific mask values may be chosen based on system application or design choice without affecting the spirit or scope of the present disclosure. If no, proceed back to block 330. If yes, proceed to block 355. In block 355, determine if all the GNSS pairs have been checked, i.e. cross-correlation tested in accordance with the exemplary blocks illustrated in FIG. 3. If not all GNSS pairs have been checked, proceed back to block 310 to continue the algorithm for all the unchecked GNSS pairs. If all the GNSS pairs have been checked, proceed to block 360 to end the cross-correlation test.

The two GNSS source peak measurements chosen in block 310 may vary for the different modes listed in the cross-correlation mask table. The cross-correlation test is performed whenever it receives peak measurements. Since all known visible GNSS sources are continuously being tracked, any cross-correlation GNSS source is observed not long before its cross-correlation maxima is observed. In one aspect, to avoid using old GNSS source peak measurements in the cross-correlation test, a timer check algorithm is also used when selecting the GNSS source peak measurements.

In one aspect, the timer check algorithm includes the following:
1) Input a first GNSS source peak measurement just received from a first GNSS source into block 310 of FIG. 3.
2) Input a second GNSS source peak measurement from a database into block 310 of FIG. 3 if the following condition is met:
   Timer check: Assume the weaker of the first GNSS source peak measurement or second GNSS source peak measurement is observed after L seconds total integration, and assume it is observed at observation time $t_{weak}$. Assume the stronger of the first GNSS source peak measurement or second GNSS source peak measurement is observed at observation time $t_{strong}$.
   If $t_{weak} - t_{strong} < (L+h)$, then the timer check is considered "passed," wherein (L+h) is the timer check threshold. In one example, h is set at 2 seconds.

Once the two GNSS source peak measurements are inputted into block 310 to run the cross correlation test (FIG. 3), if the first GNSS source peak measurement does not pass the cross-correlation test, discard the first GNSS source peak measurement. If the second GNSS source peak measurement does not pass the cross-correlation test, discard the second GNSS source peak measurement from the database. Thus, in one aspect, the cross-correlation test applies to discarding peak measurements just received and peak measurements already stored in the database.

In one aspect, to improve time-to-first-fix (TTFF), there is no need to wait for the cross-correlation test of all GNSS sources to he completed. In one example, the following four steps of search are performed to provide a GNSS source measurement:
1. Perform an acquisition search to find a peak in a wide frequency and time window.
2. Perform a cross-correlation test on the peak found against all known GNSS source measurements. This step may prevent scheduling too many unnecessary verify searches on the cross-correlation spurs. Only the peak that is not a cross correlation will proceed to the next step.
3. Perform a verify search to verify the peak in a small frequency and time search window.
4. Following a successful verify search, perform a cross-correlation test on the peak. If the peak passes the cross-correlation test, store it in the measurement database and use it in the position fix calculation.

If it is suspected that strong GNSS source peak measurements do not exist in the measurement database, it would be necessary in step 2 (above) to wait for all searches on all GNSS sources to finish. This would delay putting valid peak into the measurement database and hence, degrade the time-to-first-fix (TTFF). In one aspect, to improve TTFF, if the GNSS source peak measurement meets any one of the following criteria, perform a verify search (step 3 above) on the GNSS source peak measurement without performing the cross-correlation test in step 2 above:
   a. If the GNSS source peak measurement has an estimated C/No higher than a first pre-determined C/No threshold. In one example, the first pre-determined C/No threshold is set at 37 dB-Hz. In one aspect, the first pre-determined C/No threshold is the Not-Cross-Correlation Threshold ($Th_{not-cross-corr}$).
   b. If only one GNSS source peak measurement is found for a GNSS source after more than a pre-determined quantity of frequency swaths has been searched and the estimated C/No is higher than a second pre-determined C/No threshold. In one example, the pre-determined quantity of frequency swaths is set at 5. In one example the second pre-determined C/No threshold is set at (30+x) dB-Hz where x is determined based on particular applications and system parameters.

In the above, the total time and frequency uncertainty may be divided into many segments, with each segment spanning particular time and frequency uncertainty (space). A frequency swath refers to a particular segment, so that searching a frequency swath refers to correlating the received signal with a set of local reference signals covering the particular segment of time and frequency uncertainty. It is estimated that a strong interferer would likely cause more than a single cross-correlation spur. One skilled in the art would understand that the C/No thresholds and the quantity of frequency swaths search are set based on particular applications, system parameters and error tolerance. One exemplary algorithm to determine whether to perform a verify search is as follows:

```
bool schedule_verify_search( ){
  /* max peak is above absolute cant be xcorr thresh
```

-continued

```
*/
    if (max_peak > 37dBHz){
        schedule verify of max_peak, and DO NOT remove
this peak from Candidate DB ;
        flag this peak in the Candidate DB to avoid re-
verify it;
            return true;
    }
    /* only one peak in candidate list above 30+x dB-Hz,
almost certainly a valid peak. A conservative value of
x is 2, and A** SW set x=0 */
    if ( (# of peaks in candidate list = 1) AND (peak >
30+x dB-HZ) AND (# of frequency swaths >= 5) ) {
        schedule verify of peak, and DO NOT remove this
peak from Candidate DB ;
        flag this peak in the Candidate DB to avoid re-
verify it;
            return true;
    }
    /* either there are multiple peaks in candidate list
below absolute cant be xcorr thresh, one weak peak or
no peaks were found. We could have xcorrs, jammers, or
a noise false alarm + valid peak. Wait until all SVs
complete before scheduling possible verify on peaks
that pass xcorr masks */
        return false;
}
where SV represent GNSS source and A** represent a
particular example.
```

In one aspect, multiple candidate peak measurements may be found for each GNSS source. When the number of GNSS source peak measurements is large, there may be a significant quantity of computations to run cross-correlation tests. In one aspect, an optimization approach is used to group the GNSS source peak measurements to reduce the quantity of computations. The GNSS source peak measurements are grouped according to their C/No value into three groups (Group A, Group B and Group C). Two C/No thresholds are selected based on the particular application, system parameter and error tolerance.

Group A includes peak measurements with C/No estimation higher than C/No Threshold #1. C/No threshold #1 is chosen such that it is likely that the peak measurements in Group A cannot be cross-correlation spurs, but can be cross-correlation source peaks.

Group B includes peak measurements with C/No estimation between C/No Threshold #1 and C/No Threshold #2. C/No threshold #1 and C/No Threshold #2 are chosen such that it is likely that the peak measurements in Group B cannot be cross-correlation spurs, and cannot be cross-correlation source peaks.

Group C includes peak measurements with C/No estimation lower than and C/No Threshold #2. C/No Threshold #2 is chosen such that it is likely that the peak measurements in Group C can be cross-correlation spurs, but cannot be cross-correlation source peaks.

In one example, C/No Threshold #1 is set at 41 dB-Hz and C/No Threshold #2 is set at 37 dB-Hz.

Given the grouping, the cross-correlation test is run between peak measurements in the different groups. The cross-correlation test need not be run between peak measurements within the same group. In one example, the cross-correlation test is run between peak measurements in Group A and peak measurements (from a different GNSS source) in Group C since it is assumed that only the peak measurements in Group C are potential cross-correlation spurs and may be eliminated. By performing cross-correlation test only between peak measurements of different groups, the quantity of computation is significantly reduced. In one aspect, the peak measurements in Group A are sorted according to C/No values and the cross-correlation test starts with the peak measurements in Group A with the highest C/No values. This is particularly efficient where many of the peak measurements are due to a few strong GNSS sources. An exemplary pseudo code for determining the grouping is as follows:

```
Assume x[32][5] contains peaks are found. The 5 peaks
in candidate list per SV is not necessary to be sorted
by C/No
Create 3 lists to store indexes for Group A, B, and C;
call them List A, B, C.
Each pk in x[32][5] should be given a global index,
for example, we could use svID*5+pkID, which will
index the pks from 0 to 159.
/* Build List A, B, C */
for(svID=0; svID<32; svID++)
{
    for (pkID=0; pkID<5; pkID++)
    {
        if (x[svID][pkID] contains a peak)
        {
            if (x[svID][pkID]->CNo > 41dB-Hz)
            {
            add pk index (for example, svID * 5 + pkID)
into List A
            }
            else if (x[svID][pkID]->CNo > 37dB-Hz)
            {
            add pk index into List B
            }
            else
            {
            add pk index into List C
            }
        }
    }
}
Optionally, sort the pk indexes in List A based on the
C/No, the result is the pk with Max C/No is first item
in List A.
/* run xcorr test between Group A and Group C, to weed
out potential xcorrs in Group C */
Set ptr_A to point to the first pk in List A;
While (there is pk in List A)
{
    From index in List A that ptr_A points to, get
src_svID and src_pkID;
    Set ptr_C to point to the first pk in List C;
    while (there is pk in List C)
    {
    From index in List C that ptr_C points to, get
meas_svID and meas_pkID;
        /* only run xcorr test with peaks from other
SVs */
        if (src_svID != meas_svID)
        {
            /* function pk_is_xcorr( ) implements
xcorr test algorithm in Section 2 */
            call function pk_is_xcorr( );
            if (meas_svID is xcorr)
            {
/* keep deleting xcorr peaks from List C, thus reduce
later    computation */
            remove its index from List C;
            }
        }
        move ptr_C to point to the next pk in List C;
    }
    move ptr_A to point to the next pk in List A
}
The pks that pass xcorr test and qualify verify search
are
pks in List A
pks in List B
pks in List C (xcorr peaks have been removed from
Group C)
where SV is GNSS source.
```

One skilled in the art would understand that the disclosure herein can apply to a GPS source and a corresponding GPS receiver without affecting the scope or spirit of the disclosure. The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed:

1. A method for cross-correlation spur mitigation comprising, with a processor unit:
choosing from a plurality of peak measurements, a first peak measurement with a first carrier-to-noise density estimate and a first Doppler offset measurement, and a second peak measurement with a second carrier-to-noise density estimate and a second Doppler offset measurement to form a pair, wherein the first and second peak measurements satisfy a timer check, wherein to satisfy the timer check, an absolute value of a difference in observation times of the first peak measurement and the second peak measurement is less than a timer check threshold;
generating one or more electrical signals representing a carrier-to-noise density difference based on the first carrier-to-noise density estimate and the second carrier-to-noise density estimate;
generating one or more electrical signals representing a Doppler difference based on the first Doppler offset measurement and the second Doppler offset measurement;
comparing the carrier-to-noise density difference to a carrier-to-noise density threshold; and
comparing the Doppler difference to at least one Doppler threshold.

2. The method of claim 1 further comprising, with the processor unit:
performing an acquisition search to find a peak in a wide frequency and time window;
performing a first cross-correlation test on the peak found against all known source measurements;
performing a verify search to verify the peak in a small frequency and time search window;
following success in the verify search, performing a second cross-correlation test on the peak; and
in response to a determination that the peak passes the second cross-correlation test, initiating storage of the peak in a measurement database to use for position fix calculation.

3. The method of claim 1 further comprising, with the processor unit:
in response to a determination that a source peak measurement has an estimated C/No higher than a first C/No threshold or in response to a determination that only one source peak measurement is found after more than a pre-determined quantity of frequency swaths has been searched and its estimated C/No is higher than a second C/No threshold:
performing an acquisition search to find a peak in a wide frequency and time window;
performing a verify search to verify the peak in a small frequency and time search window;
following success in the verify search, performing a cross-correlation test on the peak; and
in response to a determination that the peak passes the cross-correlation test, initiating storage of the peak in a measurement database to use for position fix calculation.

4. The method of 3 wherein the first C/No threshold is 37 dB-Hz.

5. The method of 4 wherein the pre-determined quantity of frequency swaths is 5 and the second C/No threshold is set at (30+x) dB-Hz where x is 2.

6. The method of claim 1 further comprising, with the processor unit:
comparing the first carrier-to-noise density estimate with the second carrier-to-noise density estimate to identify the first peak measurement and the second peak measurement as either a stronger peak measurement or a weaker peak measurement; and
generating one or more electrical signals representing the carrier-to-noise density difference by subtracting the first carrier-to-noise density estimate from the second carrier-to-noise density estimate wherein the first carrier-to-noise density estimate is associated with the stronger peak measurement.

7. The method of claim 1 further comprising, with the processor unit:
identifying the first peak measurement and the second peak measurement as either a stronger peak measurement or a weaker peak measurement, and wherein generating the one or more electrical signals representing the Doppler difference comprises subtracting the first Doppler offset measurement from the second Doppler offset measurement wherein the first Doppler offset measurement is associated with the stronger peak measurement.

8. The method of claim 1 wherein the carrier-to-noise density threshold is selected from a list.

9. The method of claim 1 wherein the at least one Doppler threshold is selected from a list.

10. The method of claim 1 wherein the Doppler difference is calculated in modulo 1kHz.

11. The method of claim 1 wherein the at least one Doppler threshold comprises a max Doppler threshold and a min Doppler threshold.

12. The method of claim 11 further comprising, with the processor unit:
determining whether all of a plurality of threshold values have been tested in response to a determination that the Doppler difference is not greater or not equal to the min Doppler threshold.

13. The method of claim 11 further comprising, with the processor unit:
determining whether all of a plurality of threshold values have been tested in response to a determination that the Doppler difference is not less than or not equal to the max Doppler threshold.

14. The method of claim 1 wherein the carrier-to-noise density threshold, the max Doppler threshold and the min Doppler threshold are selected from a list.

15. The method of claim 1 further comprising, with the processor unit:
identifying either the first peak measurement or the second peak measurement as a weaker peak measurement.

16. The method of claim 15 further comprising, with the processor unit:
identifying the weaker peak measurement as a cross-correlation spur.

17. The method of claim 16 further comprising, with the processor unit:
discarding the cross-correlation spur.

18. The method of claim 16 further comprising, with the processor unit:
determining whether any two of the plurality of peak measurements have not been cross-correlation tested; and ending the cross-correlation testing in response to a determination that all of the plurality of peak measurements have been cross-correlation tested.

19. The method of claim 1 further comprising, with the processor unit:
determining whether all of a plurality of threshold values have been tested in response to a determination that the carrier-to-noise density difference is not greater or not equal to the carrier-to-noise density threshold.

20. The method of claim 1 further comprising, with the processor unit:
grouping the plurality of peak measurements into at least three groups based on at least two carrier-to-noise density thresholds.

21. The method of claim 20 wherein one of the at least two carrier-to-noise density thresholds has a value of 37dB-Hz.

22. The method of claim 20 wherein one of the at least two carrier-to-noise density thresholds has a value of 41 dB-Hz.

23. The method of claim 20 wherein one of the at least two carrier-to-noise density thresholds has a value of 37dB-Hz and the other one of the at least two carrier-to-noise density thresholds has a value of 41 dB-Hz.

24. The method of claim 20 wherein each of the peak measurements in a first group of the at least three groups is cross-correlation tested only with peak measurements in a second group of the at least three groups.

25. The method of claim 1 further comprising, with the processor unit:
identifying either the first peak measurement or the second peak measurement as a weaker peak measurement, wherein one of the first carrier-to-noise density estimate or the second carrier-to-noise density estimate is a weaker carrier-to-noise density estimate associated with the weaker peak measurement; and
determining whether the weaker carrier-to-noise density estimate is greater than a Not- Cross-Correlation threshold.

26. The method of claim 25 wherein the Not-Cross-Correlation threshold is 37dB-Hz.

27. The method of claim 25 further comprising, with the processor unit:
initiating storage of the weaker peak measurement in a database for use for position fix calculation, in response to a determination that the weaker carrier-to-noise density estimate is greater than the Not-Cross-Correlation threshold.

28. A GNSS receiver comprising:
a digital signal processor for performing cross-correlation testing on a plurality of peak measurements wherein the digital signal processor comprises a processor unit to:
choose from the plurality of peak measurements, a first peak measurement with a first carrier-to-noise density estimate and a first Doppler offset measurement, and a second peak measurement with a second carrier-to-noise density estimate and a second Doppler offset measurement to form a pair, wherein the first and second peak measurements satisfy a timer check, wherein to satisfy the timer check, an absolute value of a difference in observation times of the first peak measurement and the second peak measurement is less than a timer check threshold;
calculate a carrier-to-noise density difference based on the first carrier-to-noise density estimate and the second carrier-to-noise density estimate;
calculate a Doppler difference based on the first Doppler offset measurement and the second Doppler offset measurement;
compare the carrier-to-noise density difference to a carrier-to-noise density threshold; and
compare the Doppler difference to at least one Doppler threshold.

29. The GNSS receiver of claim 28 wherein the GNSS receiver is a GPS receiver.

30. The GNSS receiver of claim 28 the processor unit to further:
perform an acquisition search to find a peak in a wide frequency and time window;
perform a first cross-correlation test on the peak found against all known source measurements;
perform a verify search to verify the peak in a small frequency and time search window;
following success in the verify search, perform a second cross-correlation test on the peak; and
in response to a determination that the peak passes the second cross-correlation test, store the peak in a measurement database to use for position fix calculation.

31. The GNSS receiver of claim 28 wherein in response to a determination that a source peak measurement has an estimated C/No higher than a first C/No threshold or in response to a determination that only one source peak measurement is found after more than a pre-determined quantity of frequency swaths has been searched and its estimated C/No is higher than a second C/No threshold, then the processor unit to further:
perform an acquisition search to find a peak in a wide frequency and time window;
perform a verify search to verify the peak in a small frequency and time search window;
following success in the verify search, perform a cross-correlation test on the peak; and
in response to a determination that the peak passes the cross-correlation test, store the peak in a measurement database to use for position fix calculation.

32. The GNSS receiver of 31 wherein the first C/No threshold is 37 dB-Hz.

33. The GNSS receiver of 32 wherein the pre-determined quantity of frequency swaths is 5 and the second C/No threshold is set at (30+x) dB-Hz where x is 2.

34. The GNSS receiver of claim 28 further comprising an antenna for receiving a plurality of RF signals.

35. The GNSS receiver of claim 34 further comprising a frequency converter for downconverting the plurality of RF signals to a plurality of downconverted signals.

36. The GNSS receiver of claim 35 further comprising an A/D converter for converting the plurality of downconverted signals to a plurality of digitized signals.

37. The GNSS receiver of claim 36 wherein the plurality of digitized signals is correlated with a plurality of reference functions to generate the plurality of peak measurements.

38. An article comprising:
a non-transitory computer-readable medium having stored thereon program code executable by a processor unit to:
choose from a plurality of peak measurements, a first peak measurement with a first carrier-to-noise density estimate and a first Doppler offset measurement, and a second peak measurement with a second carrier-to-noise density estimate and a second Doppler offset measurement to form a pair, wherein the first and second peak measurements satisfy a timer check, wherein to satisfy the timer check, an absolute value of a difference in observation times of the first peak measurement and the second peak measurement is less than a timer check threshold;

calculate a carrier-to-noise density difference based on the first carrier-to-noise density estimate and the second carrier-to-noise density estimate;

calculate a Doppler difference based on the first Doppler offset measurement and the second Doppler offset measurement;

compare the carrier-to-noise density difference to a carrier-to-noise density threshold; and compare the Doppler difference to at least one Doppler threshold.

39. The article of claim 38 wherein the program code is further executable by the processor unit to:

perform an acquisition search to find a peak in a wide frequency and time window;

perform a first cross-correlation test on the peak found against all known source measurements;

perform a verify search to verify the peak in a small frequency and time search window;

perform a second cross-correlation test on the peak following success from the verify search; and in response to a determination that the peak passes the second cross-correlation test, store the peak in a measurement database to use for position fix calculation.

40. The article of claim 38 wherein in response to a determination that a source peak measurement has an estimated C/No higher than a first C/No threshold or in response to a determination that only one source peak measurement is found after more than a pre-determined quantity of frequency swaths has been searched and its estimated C/No is higher than a second C/No threshold, the program code is further executable by the processor unit to:

perform an acquisition search to find a peak in a wide frequency and time window;

perform a verify search to verify the peak in a small frequency and time search window;

perform a cross-correlation test on the peak following success in the verify search; and in response to a determination that the peak passes the cross-correlation test, store the peak in a measurement database to use for position fix calculation.

41. The article of claim 38 the program code is further executable by the processor unit to:

compare the first carrier-to-noise density estimate with the second carrier-to-noise density estimate to identify the first peak measurement and the second peak measurement as either a stronger peak measurement or a weaker peak measurement; and calculate the carrier-to-noise density difference by subtracting the first carrier-to-noise density estimate from the second carrier-to-noise density estimate wherein the first carrier-to-noise density estimate is associated with the stronger peak measurement.

42. The article of claim 38 the program code is further executable by the processor unit to:

identify the first peak measurement and the second peak measurement as either a stronger peak measurement or a weaker peak measurement, and calculate the Doppler difference by subtracting the first Doppler offset measurement from the second Doppler offset measurement wherein the first Doppler offset measurement is associated with the stronger peak measurement.

43. An apparatus for cross-correlation spur mitigation in a GNSS receiver, the apparatus comprising:

means for choosing from a plurality of peak measurements, a first peak measurement with a first carrier-to-noise density estimate and a first Doppler offset measurement, and a second peak measurement with a second carrier-to-noise density estimate and a second Doppler offset measurement to form a pair, wherein the first and second peak measurements satisfy a timer check, wherein the absolute value of the difference of the observation times of the first peak measurement and the second peak measurement is less than a timer check threshold;

means for determining a carrier-to-noise density difference based on the first carrier-to-noise density estimate and the second carrier-to-noise density estimate;

means for determining a Doppler difference based on the first Doppler offset measurement and the second Doppler offset measurement;

means for comparing the carrier-to-noise density difference to a carrier-to-noise density threshold; and means for comparing the Doppler difference to at least one Doppler threshold.

44. The apparatus of claim 43 further comprising:

means for performing an acquisition search to find a peak in a wide frequency and time window;

means for performing a first cross-correlation test on the peak found against all known source measurements;

means for performing a verify search to verify the peak in a small frequency and time search window;

means for performing a second cross-correlation test on the peak following success from the verify search; and means for storing the peak in a measurement database to use for position fix calculation, in response to a determination that the peak passes the second cross-correlation test.

45. The apparatus of claim 43 wherein, in response to a determination that a source peak measurement has an estimated C/No higher than a first C/No threshold or in response to a determination that only one source peak measurement is found after more than a pre-determined quantity of frequency swaths has been searched and its estimated C/No is higher than a second C/No threshold, initiating:

means for performing an acquisition search to find a peak in a wide frequency and time window;

means for performing a verify search to verify the peak in a small frequency and time search window;

means for performing a cross-correlation test on the peak following success in the verify search; and means for storing the peak in a measurement database to use for position fix calculation, in response to a determination that the peak passes the cross-correlation test.

46. The apparatus of claim 43 further comprising:

means for comparing the first carrier-to-noise density estimate with the second carrier-to-noise density estimate to identify the first peak measurement and the second peak measurement as either a stronger peak measurement or a weaker peak measurement; and means for calculating the carrier-to-noise density difference by subtracting the first carrier-to-noise density estimate from the second carrier-to-noise density estimate wherein the first carrier-to-noise density estimate is associated with the stronger peak measurement.

47. The apparatus of claim 43 further comprising:

means for identifying the first peak measurement and the second peak measurement as either a stronger peak measurement or a weaker peak measurement; and means for calculating the Doppler difference by subtracting the first Doppler offset measurement from the second Doppler offset measurement wherein the first Doppler offset measurement is associated with the stronger peak measurement.

* * * * *